US012258649B2

(12) United States Patent
Crutzen et al.

(10) Patent No.: US 12,258,649 B2
(45) Date of Patent: Mar. 25, 2025

(54) HIGH-RESISTANCE STEEL STRIP COMPRISING A TEMPERATURE HOMOGENISATION CHAMBER

(71) Applicants: DREVER INTERNATIONAL, Liège (BE); John Cockerill SA, Seraing (BE)

(72) Inventors: Jean-Pierre Crutzen, Chaudfontaine (BE); Lutz Kümmel, Jüchen (DE); Frank Maschler, Duisburg (DE); Michel Renard, Liège (BE)

(73) Assignees: DREVER INTERNATIONAL, Liège (BE); John Cockerill SA, Seraing (BE)

( * ) Notice: Subject to any disclaimer, the term of this patent is extended or adjusted under 35 U.S.C. 154(b) by 0 days.

(21) Appl. No.: 18/532,051

(22) Filed: Dec. 7, 2023

(65) Prior Publication Data

US 2024/0102124 A1 Mar. 28, 2024

Related U.S. Application Data

(62) Division of application No. 16/722,637, filed on Dec. 20, 2019, now abandoned.

(30) Foreign Application Priority Data

Jan. 23, 2019 (BE) .................................... 20195038

(51) Int. Cl.
*C21D 9/56* (2006.01)
*C21D 1/26* (2006.01)
(Continued)

(52) U.S. Cl.
CPC ............... *C21D 9/561* (2013.01); *C21D 1/26* (2013.01); *C21D 1/34* (2013.01); *C21D 1/52* (2013.01);
(Continued)

(58) Field of Classification Search
CPC . C21D 9/561; C21D 1/52; C21D 1/76; C21D 1/773; C21D 9/562; C21D 1/34;
(Continued)

(56) References Cited

U.S. PATENT DOCUMENTS 8,636,854 B2 1/2014 Leuschner et al.
9,096,919 B2 8/2015 Blumenau et al.
(Continued)

FOREIGN PATENT DOCUMENTS

EP 2010690 B1 2/2010
EP 2732062 B1 6/2016
(Continued)

OTHER PUBLICATIONS

Machine Translation of ES-2701838-T5 (Year: 2023).*
(Continued)

*Primary Examiner* — Adil A. Siddiqui
(74) *Attorney, Agent, or Firm* — CHRISTENSEN O'CONNOR JOHNSON KINDNESS PLLC

(57) ABSTRACT

Method for thermally treating a scrolling steel strip (5), said method comprising the following steps: heating the strip (5) in a zone for heating with a direct flame (10); temperature homogenisation of the strip (5) in a homogenisation chamber (20) comprising at least one radiant heating tube (25), so as to homogenise the strip (5) in temperature after the passing thereof into the zone for heating with a direct flame (10) of the preceding step; oxidation of the strip (5) in an oxidation chamber (30) with an oxidising atmosphere having an oxygen volume concentration greater than 1%; reduction of the strip (5) in a reduction zone (40).

11 Claims, 2 Drawing Sheets

(51) Int. Cl.

| | |
|---|---|
| ***C21D 1/34*** | (2006.01) |
| ***C21D 1/52*** | (2006.01) |
| ***C21D 1/74*** | (2006.01) |
| ***C21D 1/76*** | (2006.01) |
| ***C21D 1/773*** | (2006.01) |
| ***C21D 9/46*** | (2006.01) |
| ***C23C 8/10*** | (2006.01) |
| ***C23C 8/18*** | (2006.01) |
| ***C23C 8/80*** | (2006.01) |
| ***F27B 9/28*** | (2006.01) |

(52) U.S. Cl.
CPC ................. *C21D 1/74* (2013.01); *C21D 1/76* (2013.01); *C21D 1/773* (2013.01); *C21D 9/46* (2013.01); *C21D 9/56* (2013.01); *C21D 9/562* (2013.01); *C21D 9/563* (2013.01); *C23C 8/10* (2013.01); *C23C 8/18* (2013.01); *C23C 8/80* (2013.01); *F27B 9/28* (2013.01)

(58) Field of Classification Search
CPC ... C21D 9/46; C21D 1/26; C21D 1/74; C21D 9/563; C21D 9/56; C23C 8/10; C23C 8/18; C23C 8/80; F27B 9/28
See application file for complete search history.

(56) References Cited

U.S. PATENT DOCUMENTS

| | | | | |
|---|---|---|---|---|
| 9,279,172 | B2 | 3/2016 | Blumenau et al. | |
| 9,279,175 | B2 | 3/2016 | Blumenau et al. | |
| 2002/0104597 | A1 * | 8/2002 | Frank .................. | C21D 8/0226 148/547 |
| 2008/0023111 | A1 * | 1/2008 | Nakanishi ............. | C23C 2/0038 148/284 |
| 2010/0173072 | A1 | 7/2010 | Borrel | |
| 2017/0137906 | A1 | 5/2017 | Fan et al. | |
| 2018/0100209 | A1 * | 4/2018 | Dubois .................... | C21D 9/60 |

FOREIGN PATENT DOCUMENTS

| | | | | |
|---|---|---|---|---|
| ES | 2701838 | T5 * | 10/2023 | ......... A61F 13/0276 |
| KR | 20160085830 | A | 7/2016 | |
| WO | WO-2016001899 | A1 * | 1/2016 | ......... A61F 13/0276 |

OTHER PUBLICATIONS

Rapport De Recherche De Type International completed Apr. 11, 2019, for Belgian Application No. 201905038, filed Jan. 23, 2019. 11 pages.

* cited by examiner

HIGH-RESISTANCE STEEL STRIP COMPRISING A TEMPERATURE HOMOGENISATION CHAMBER

CROSS REFERENCE TO RELATED APPLICATION

This application is a Divisional Application of U.S. application Ser. No. 16/722,637, filed on Dec. 20, 2019, which claims priority under 35 U.S.C. § 119 to Belgium Application No. BE2019/5038, filed Jan. 23, 2019, the entirety of which is hereby incorporated by reference.

TECHNICAL FIELD

According to a first aspect, the invention relates to a method for thermally treating a high-resistance steel strip. According to a second aspect, the invention relates to a furnace for thermally treating a high-resistance steel strip.

BACKGROUND

Commonly used high-resistance steels comprise alloy elements, for example manganese, silicon, chromium and/or aluminium alloy. During an annealing step, the alloy elements present in the high-resistance steel can diffuse towards the surface of the steel and be rapidly oxidised due to the great affinity thereof for oxygen and this, even in radiant tube zones where the atmosphere is nevertheless reducing for iron oxides. This selective oxidation creates surface defects which make it difficult to adhere the zinc coating (or other metal or alloy) applied during the galvanisation of the surface. This wettability problem is a limiting aspect of the galvanisation which cannot be carried out correctly.

Studies have been carried out in order to understand the kinetics of these oxidation phenomena and to provide solutions to the problems posed during galvanisation. One particularly studied route consists of subjecting, in the annealing furnace, the surface of the strips to temperature and atmosphere conditions specific to rapidly and deeply oxidising the alloy elements and thus avoid the migration thereof into the surface. During this operation, an iron oxide layer is formed which will subsequently be removed in the following zones of the annealing furnace under a reducing atmosphere.

It is known from the documents of the state of the art, and in particular from EP 2 732 062 B1, that an oxidation of metal products can be achieved during the heating by direct flame. According to this document, the oxidation potential of the atmosphere around the metal product during the heating by direct flame can be adjusted by modifying the excess oxygen. U.S. Pat. No. 9,279,175 B2 underlines the importance of forming an oxide layer, which is as homogenous as possible, in order to constitute an effective diffusion barrier. EP 2 732 062 B1, however, specifies that the specific adjustment of an oxide thickness, i.e. obtaining a uniform distribution over the surface of the steel, can only be controlled with great difficulty, which EP 2 010 690 B1 also describes.

Thus, a problem generally encountered during the thermal treatment of metal products with oxidation and reduction of the surface is in obtaining a non-homogenous surface state before the galvanisation step.

SUMMARY

According to a first aspect, one of the aims of the present invention is to provide a method for thermally treating a high-resistance steel strip making it possible to obtain, on the surface thereof, an oxide formation with a more homogenous and more controlled thickness.

To this end, the inventors propose a method for thermally treating a scrolling high-resistance steel strip, said method comprising the following steps:

a) heating the strip in a zone for heating with a direct flame;
b) homogenising in temperature the strip in a homogenisation chamber comprising at least one radiant heating tube, so as to homogenise a temperature of the strip after the passing thereof into the zone for heating with a direct flame of the preceding step;
c) oxidation of the strip in an oxidation chamber with an oxidising atmosphere having a volume concentration of oxygen greater than 1%;
d) reducing the strip in a reduction zone.

The method of the invention makes it possible, during the thermal treatment, thanks to the temperature homogenisation step, the oxidation of the strip having a surface which is more homogenous in temperature. This makes it possible for a growth of an oxide layer having a more homogenous thickness over the whole strip surface. A more homogenous oxide thickness on the surface of the strip makes it possible to have a subsequent, better controlled reduction of said oxide layer. Indeed, variations in the thickness of the oxide layer formed during the oxidation step require an adaptation of the reduction time during the reduction step, in order to reduce the oxide over the whole surface of the strip. Such an adaptation of the reduction time is based on larger oxide thicknesses for instance. The method of the invention makes it possible for better control of the time of the reduction step, as it guarantees a more homogenous oxide thickness over the strip surface.

The method of the invention is particularly advantageous, as it makes it possible to compensate for the temperature inhomogeneity of the strip, in particular of the surface of the strip during step a) of heating the strip by direct flame. Indeed, the use of a zone for heating with a direct flame makes it possible for a rapid increase in temperature of the strip, at the expense of the temperature homogeneity of the metal product. Yet, in a great number of furnaces, the oxidation chamber is positioned directly after the zone for heating with a direct flame, such that the oxidation is carried out on a strip, of which the temperature homogeneity is not well controlled.

As indicated above, a good control of the temperature of the strip during the oxidation thereof in the oxidation chamber makes it possible to obtain an oxide layer on the surface having a more homogenous thickness over the whole of the surface of the strip. It appears that the formation kinetics of an oxide layer on the surface of a high-resistance steel strip depends mainly on the surface temperature of the strip, as well as the composition of the oxidising atmosphere in the oxidation chamber. Temperature inhomogeneities on the surface of the strip can therefore lead to great variations in thickness of the oxide layer on the surface of the strip.

During the reduction of the oxide layer in the reduction zone, it is necessary to reduce the whole thickness of oxide formed in the oxidation chamber. Yet, when an oxide layer has a variable thickness, it is necessary to ensure a sufficient reduction to reduce the oxide layer in the places where this is the thickest. This can result in a slowing down of the scrolling speed in the reduction zone, or in a reducing atmosphere in the reduction zone, richer in hydrogen, or also in an extension of the reduction zone, in order to preserve an acceptable production rate. Thus, the inhomogeneity of the surface temperature of a high-resistance steel strip during its oxidation in the oxidation chamber can have consequences on the efficiency of the thermal treatment method in terms of production rate and/or costs.

Oxidation achieved during the heating by direct flame (step a)) makes an adjustment of the thickness of the FeO layer formed very difficult to control. Indeed, in EP 2 010 690 A1, it has been observed that for the same oxidising conditions at the level of the atmosphere during the heating by direct flame, an increased scrolling speed shows a thinner FeO layer with respect to lower scrolling speeds, demonstrating the great sensitivity of the method for forming iron oxide at different parameters brought into play.

An advantage of the method of the invention with respect to methods where the oxidation is achieved at the same time as the heating of the strip in a zone for heating with a direct flame is that the method of the invention makes it possible to separate the heating from the strip, the temperature homogenisation and the oxidation thereof with separate steps and furnace chambers. This makes it possible for better control of the parameters for forming iron oxide on the surface of the strip while enabling heating of the strip by direct flame. Thus, the invention makes it possible to overcome the disadvantages of the heating by direct flame by introducing a temperature homogenisation chamber. Thanks to the invention, it is therefore possible to have a furnace having a very high quality of thermal treatment, as well as a better surface state of the strip before the galvanisation thereof and this for reasonable utilisation costs.

In the whole of the document, an oxygen volume concentration must be understood as an $O_2$ (volume) concentration. The steps of the method of the invention are to be carried out according to the following order: step a), step b), step c), and step d).

Preferably, the reduction zone has a reducing atmosphere having a hydrogen volume concentration greater than 3% and preferably greater than 5%, and even more preferably, greater than 8%. An advantage associated with such hydrogen volume concentrations in the reduction zone for these preferred embodiments, is to increase the guarantee that the reduction will take place. Preferably, the remainder of the composition of the atmosphere of the reduction zone comprises nitrogen.

In the whole of the document, a hydrogen (volume) concentration must be understood as an $H_2$ (volume) concentration.

It has moreover been observed that the method of the invention is particularly effective for high-resistance steel strips, for example having a composition by weight in Cr less than 5%, preferably less than 3% and even more preferably, less than 1%. In the sense of the present invention, a steel comprising alloy elements such as manganese, silicon, chromium and/or aluminium alloy is understood by the term "high-resistance steel". Preferably, the strip has a thickness of between 0.3 mm and 3.2 mm.

The homogenisation chamber comprising at least one radiant heating tube is intended to make it possible for a standardisation/homogenisation of the temperature of the strip when the latter is present in the homogenisation chamber. The temperature standardisation of the strip is produced progressively during the passage thereof in the homogenisation chamber in order to obtain a temperature as uniform as possible at the homogenisation chamber outlet. The homogenisation chamber is not principally intended to make the average temperature of the strip vary but is rather intended to standardise the temperature of the strip.

In the homogenisation chamber, radiant elements and/or heating elements can be present, which have a power which can be modified rapidly, which makes it possible to adjust the temperature rapidly so as to maintain an optimal temperature at the inlet of the oxidation chamber and to ensure a regular oxidation of the surface of the steel strip.

Preferably, the temperature homogenisation chamber comprises two, three, or four radiant heating tubes.

The temperature of the strip is comprised in the present application as being a temperature measured on the surface of the strip and representing the temperature over the whole thickness of the strip. Indeed, for strips having a thickness of between 0.6 mm and 2.5 mm, the diffusion of the heat in the whole thickness is very rapid and it can therefore be estimated that a temperature of the strip at a point of the strip on the surface thereof is representative of the temperature in the whole of the thickness of the strip. This is particularly true when the strip is in a mainly homogenous temperature chamber. Thus, a temperature homogeneity or inhomogeneity can be characterised by surface temperature measurements of the strip in separate places. For example, a temperature inhomogeneity is observed over a strip section, when there is a temperature difference greater than 5%, preferably greater than 2% and even more preferably, greater than 1% between a point situated at the centre of the strip and a point situated on the edge of the strip. The strip temperature is, for example, an average strip temperature taken over a strip section at several different points, for example the strip temperature is the average of the temperatures measured at the level of the two edges, as well as in the centre thereof. A target strip temperature is reached when the average strip temperature and the target strip temperature are equal, or in any case, have a difference less than 2%, preferably less than 1%. In the temperature homogenisation chamber, the strip temperature remains mainly the same, but it is homogenised on the surface.

Preferably, the oxidising atmosphere in the oxidation chamber has an oxygen volume concentration of between 1.5% and 5% and even more preferably of between 2% and 5%.

Preferably, the oxidation chamber of the invention does not comprise any radiant heating tube inside it. For example, the oxidation chamber is confined, for example isolated, inside a radiant heating furnace section such that it is heated indirectly by the radiant heating tubes of the radiant heating furnace section.

Advantageously, the method according to the invention further comprises a step of homogenising the oxidising gas of the oxidation chamber comprising:

- suctioning at least some of the oxidising gas outside of the oxidation chamber,
- cooling of said at least some of the oxidising gas,
- movement by a ventilator of said at least some of said oxidising gas,
- oxygen enrichment of said at least some of said oxidising gas by air injection,
- a reinjection of said at least some of said oxidising gas in the oxidation chamber.

It has been observed that the homogenisation of the oxidising gas makes it possible to improve the control over the oxidation step and to obtain the formation of an oxide layer on the surface of the steel strip, whose thickness is more homogenous and/or reproducible.

The heating by direct flame is used to clean the high-resistance steel strip (degreasing, for example). The cleaning makes it possible, in particular, to remove the organic residue present on the surface of the steel strip.

Preferably, the oxidation step is carried out at a strip temperature of between 650° C. and 750° C.

It has been observed that when said oxidation step is carried out in the temperature range of between 650° C. and 750° C., this provides good control over the thickness of the iron oxide layer formed during the oxidation step and provides the stability for the whole annealing method.

A strip temperature of between 650° C. and 750° C. makes it possible for good control of the oxidation kinetics of the surface of the strip during the passing thereof into the oxidation chamber, wherein the oxygen volume concentration is greater than 1%. Preferably, the oxygen volume concentration in the oxidation chamber is between 1.5% and 5% and even more preferably, between 2% and 5%. Controlling the homogeneity of the oxidation kinetics is ensured thanks to the passing of the strip into the homogenisation chamber.

It has been observed that an increased oxygen content in the oxidation chamber makes it possible to reduce the damaging impact of gas leakages. However, a too-high oxygen content has the consequence of oxidising the steel strip too deeply, which requires a subsequent step of removing said iron oxide layer for a longer duration, which represents a disadvantage in terms of time and therefore cost. The inventors have determined that the oxygen concentration values of between 1.5% and 5% and even more preferably, between 2% and 5% make it possible for an oxidation step which is not or is hardly impacted by the possible gas leakages, without generating an iron oxide layer which is too thick.

Preferably, the duration of exposure of said steel strip in the oxidation chamber is between 2 and 8 seconds, preferably going from 2 to 4 seconds.

Advantageously, the oxidation step is performed in a confined or relatively confined manner in the oxidation chamber.

In the sense of the invention, it is understood by the terms "relatively isolated" or "confined" that a relative sealing is guaranteed in the element in question. Suitable technical means can be implemented to control this relative sealing in order to reduce, as much as possible, the gas exchanges between the oxidising atmosphere of said oxidation chamber and the atmosphere outside of said oxidation chamber, for example in the remainder of the RTF. An RTF is a furnace section mainly comprising radiant heating tubes and is an acronym known to a person skilled in the art (RTF means Radiant Tube Furnaces).

Preferably, the oxidation step is homogenous in that it makes it possible for the homogenous oxidation on the surface of said steel strip.

Preferably, the oxidation step is carried out by propulsion of an oxidising gas by means of a carrier gas, preferably nitrogen.

It has been observed that this propulsion by means of a carrier gas makes it possible to bring the oxidising gas to the surface of said steel strip and to pass through the limit layer driven by the steel strip. This thus results in, as an advantageous effect, that at least one of the iron layers situated below said surface of said steel strip can also be oxidised. Better control and a better reproducibility and/or homogeneity can thus be guaranteed during the formation of the iron oxide layer formed during the oxidation step.

Advantageously, the method according to the invention comprises the application of a pressure inside said oxidation chamber and in the remainder of the furnace, said pressures being substantially equal.

It has been observed that the risk of gaseous transfers between the oxidation chamber and the remainder of the furnace used in the method according to the invention is highly reduced when the pressure in the oxidation chamber and in the device are substantially equal.

In addition, the method according to the invention makes it possible to maintain an easily controllable oxidation which avoids the disturbances caused by the atmosphere which surrounds the oxidation chamber.

Preferably, heating step a), temperature homogenisation step b), as well as reduction step d) are carried out with a reducing atmosphere having a hydrogen volume concentration greater than 3%.

Preferably, the reducing atmosphere in the reduction zone has an atmosphere having a hydrogen concentration of between 3% and 5%. Preferably, the reduction zone has a composition comprising a hydrogen concentration of between 3% and 5%, the remainder of the composition comprising nitrogen.

Preferably, the temperature homogenisation step is carried out at a strip temperature of between 650° C. and 750° C.

As stated above, such a temperature range makes it possible for good control of the kinetics for forming oxide in the oxidation chamber, i.e. in the presence of an oxygen volume concentration generally of between 1% and 5%. In addition, it is particularly advantageous to homogenise the strip temperature at a target temperature. A homogenisation at a target temperature means that there is a heat input to the strip strictly equal to the heat lost by the strip. Thus, the homogenisation is achieved with a mainly zero heat input/loss balance so as to prevent the introduction of other temperature inhomogeneities to the strip.

Preferably, the heating step a) is carried out, so as to obtain a strip temperature of between 650° C. and 750° C.

Such a strip temperature range is easily achievable by heating by direct flame, which makes step a) relatively easy to implement. Preferably, step a) is carried out under reducing conditions in the presence of carbon monoxide and hydrogen. Such conditions are generated by using a non-stoichiometric fuel/oxidiser mixture and particularly low in oxygen.

Preferably, the temperature homogenisation step is carried out with an atmosphere having an oxygen volume concentration less than 0.01% by volume, preferably with an atmosphere without oxygen.

Although the temperature homogenisation step is carried out in a chamber adjacent to the oxidation chamber, the atmosphere in the homogenisation chamber can be kept low, even very low, in oxygen. This can be made possible according to a preferred embodiment, by the presence of confinement means positioned between the oxidation chamber and the homogenisation chamber, for example by using an airlock.

Such confinement means can be particularly desired as significant passages of gas or badly controlled passages of gas between the oxidation chamber and the reduction zone and/or the temperature homogenisation chamber, can lead to damaging gas exchanges between the different chambers of the furnace. When the oxygen escapes from the oxidation chamber to a chamber under reducing atmosphere, the water vapour content increases in this zone. Then, the increase in water vapour content impacts the dew point and can lead to undesired oxidation phenomena, like for example the oxidation of alloy compounds on the surface of the steel. As already explained, these alloy compounds have a great affinity for oxygen, and the selective oxidation thereof has a detrimental impact on the adhesion of the coating obtained after galvanisation.

Moreover, the oxygen volume concentration in the oxidation chamber (greater than 1%, even of between 1.5% and 5% according to a preferred embodiment), can represent a volume concentration, particularly sensitive to undesired gas exchanges with adjacent chambers. Confinement means positioned between the oxidation chamber and the homogenisation chamber, for example an airlock, make it possible to further control the oxygen concentration in the oxidation chamber. This is significant, as when hydrogen escapes from a chamber under reducing atmosphere to the inside of the oxidation chamber, the oxidation is no longer as effective, as some of the oxygen is consumed by reaction with hydrogen. These phenomena negatively impact the properties of the iron oxide layer formed during the oxidation step. This problem is amplified when the oxygen content is relatively low in the oxidation chamber, as the oxygen will thus be consumed even more rapidly by reaction with hydrogen.

Generally, these leakages therefore highly reduce the controlling of the conditions of the annealing method, which, consequently, leads to a lack of control on the quality of a galvanised high-resistance steel obtained after galvanisation of the strip treated according to the first aspect of the invention, in particular in terms of adhesion of the coating layer on the surface of the steel strip.

Preferably, the heating step a) is carried out with an atmosphere having an oxygen volume concentration less than 0.01% by volume, preferably with an atmosphere without oxygen.

It is particularly important to preheat the steel strip with an atmosphere low in oxygen and preferably without oxygen such that the steel strip does not start to be oxidised on the surface before it enters into the oxidation chamber. Thus, this results in a better control of the oxidation thickness when this is only achieved in the oxidation chamber. In addition, the temperature of the strip not being homogenous during the heating step a), it is important that no oxidation is carried out under such strip temperature inhomogeneity conditions.

Preferably, the temperature homogenisation step is carried out by the scrolling of the strip in the proximity of said at least one radiant heating tube.

The advantage of scrolling of the strip in the proximity of a radiant heating tube is to make it possible to supply a quantity of heat to the strip, well controlled over the whole width of the strip. Thus, the scrolling of the strip in the proximity of the radiant heating tube makes it possible for a heat exchange between the strip and the radiant heating tube. This makes it possible to maintain the temperature of the strip, for example at the target temperature, while making it possible for a homogenisation of the temperature of the strip. Thus, the invention makes it possible to benefit from the advantages of a heating by direct flame, while compensating for the disadvantages linked to the heating by direct flame (strip temperature inhomogeneity). For example, the strip scrolls at a distance from a radiant heating tube of between 0.1 m and 0.2 m.

Preferably, said homogenisation section comprises at least two radiant heating tubes. Preferably, the metal product scrolls between said two radiant heating tubes.

The scrolling of the steel strip in front of the two radiant heating tubes makes it possible for an improvement of the temperature homogeneity of the steel strip by leaving more time for the steel strip to be balanced in temperature while receiving a quantity of heat from the radiant heating tubes making it possible to preserve a target strip temperature. The target strip temperature is generally between 650° C. and 750° C. and corresponds to a temperature at which the oxidation of the oxidation chamber strip is well controlled. The same reasoning can be applied for three, four, six radiant heating tubes.

Preferably, the heating of the strip in step a) is carried out until reaching a target strip temperature between 650° C. and 750° C., and the temperature homogenisation of the strip in step b) is carried out so as to homogenise the temperature of the strip according to said target temperature. Preferably, the homogenisation step of step b) makes it possible to keep the strip at the target temperature.

During the temperature homogenisation step, the heat communicated by the radiant heating tube(s) to the strip has the sole aim of maintaining the temperature of the strip according to the target temperature, as well as homogenising its temperature. Preferably, the radiant heating tubes during the temperature homogenisation step radiate towards the strip in a uniform manner, making it possible for good homogenisation of the temperature of the strip, on the surface, as well as according to the thickness of the strip.

According to a second aspect, one of the aims of the present invention is to provide a furnace for the thermal treatment of a high-resistance steel strip by scrolling, making it possible for an oxide formation on the surface of the strip with a more homogenous and more controlled thickness. To this end, the inventors propose a furnace for the thermal treatment of a high-resistance metal strip by scrolling, comprising:

- a direct heating furnace section comprising:
  - a zone for heating with a direct flame;
- a radiant heating furnace section comprising:
  - an oxidation chamber;
  - a reduction zone;
  - a temperature homogenisation chamber positioned after the zone for heating with a direct flame and in front of the oxidation chamber, the homogenisation chamber comprising at least one radiant heating tube.

Thus, the temperature homogenisation chamber is positioned between the zone for heating with a direct flame and the oxidation chamber. A radiant heating furnace section is an RTF. The homogenisation chamber is situated in the radiant heating furnace section, likewise the oxidation chamber.

Preferably, said homogenisation chamber comprises at least two radiant heating tubes and even more preferably, at least three radiant heating tubes.

The number of radiant heating tubes in the homogenisation chamber makes it possible to define the length thereof, along which the strip can be balanced in temperature while remaining at the target strip temperature. The number of radiant heating tubes and the length of the temperature homogenisation chamber depend on the zone for heating by a direct flame and on the temperature inhomogeneity of the strip which emerges, as well as the desired temperature homogeneity of the strip in the oxidation chamber. The number of radiant tubes and the length of the homogenisation chamber can also depend on the target temperature at the outlet of the homogenisation chamber.

Preferably, in the temperature homogenisation chamber, the metal product is positioned scrolling between at least two radiant heating tubes. Such an embodiment makes it possible for better homogenisation of the temperature of the strip as is described for the method according to the first aspect of the invention.

For example, the furnace further comprises a first and a second roller for guiding the scrolling strip, the first roller being positioned downstream from the zone for heating with a direct flame and the second roller being positioned downstream from the oxidation chamber. The strip is preferably maintained under traction in the homogenisation chamber, such that while scrolling, said strip describes a mainly rectilinear path during the passing thereof into the homogenisation chamber and into the reduction zone.

For example, the first and second rollers are positioned such that said metal strip is stretched according to a mainly vertical orientation between said rollers. A mainly vertical strip orientation corresponds to a strip orientation with respect to a flat floor describing an angle with the norm to the flat floor of between 0° and 15°. The strip is under traction in the furnace, such that it is stretched during the passing thereof into the homogenisation chamber, then in the oxidation chamber.

In another possible embodiment, the furnace is configured such that the metal strip is stretched according to a mainly horizontal orientation.

In a preferred embodiment, the oxidation chamber is further delimited by two airlocks which are each constituted by at least two airlock rollers. In such a case, although having no permanent contact between the strip and such airlock rollers, it is possible that the strip comes into contact with them, for example, following a movement of the strip.

Preferably, the oxidation chamber is confined from the homogenisation chamber and the reduction zone by two confinement means making it possible for the scrolling of the strip through said oxidation chamber, for example, the two confinement means are two airlocks. The associated advantages described for the method of the invention are applied to the furnace, mutatis mutandis.

Preferably, the oxidation chamber is equipped with air vents in order to balance the inlet and outlet volumes to balance the pressure inside the chamber and also to reduce the possible gas transfers by leakages.

DESCRIPTION OF THE DRAWINGS

These aspects of the invention, as well as others will be clarified in the detailed description of particular embodiments of the invention, reference being made to the drawings of the figures, in which.

The drawings of the figures are not to scale and are not limiting. Generally, similar elements are referenced by similar references in the figures. The presence of reference numbers in the drawings cannot be considered as limiting, including when these numbers are indicated in the claims.

DETAILED DESCRIPTION

Figure 1:
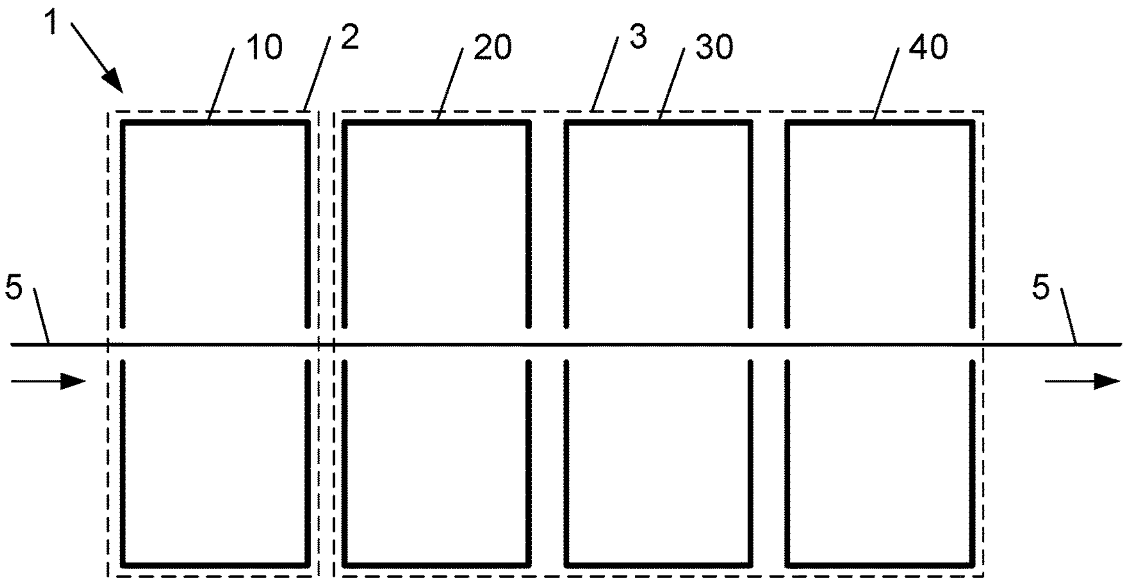
FIG. 1 shows an embodiment according to the invention.

FIG. 1 shows a schematic illustration of the furnace 1 according to the second aspect of the invention making it possible to implement the method according to the first aspect of the invention. The furnace 1 comprises, in the scrolling direction of the strip 5, a zone for heating with a direct flame 10, a temperature homogenisation chamber 20, an oxidation chamber 30 and a reduction zone 40 for reducing oxide and the thermal treatment of the strip. The furnace 1 comprises a direct heating furnace section 2 comprising the zone for heating with a direct flame 10 and a radiant heating furnace section 3 comprising the temperature homogenisation chamber 20, the oxidation chamber 30 and the reduction zone 40.

The method according to the invention comprises the implementation of step a) for heating the strip 5 by direct flame in the zone for heating with a direct flame 10. The method then comprises the implementation of step b), i.e. the scrolling of the strip 5 in the proximity of at least one radiant heating tube 25 so as, for example, to leave time for the strip 5 preheated to a target temperature, to be homogenised in temperature, while preserving said target temperature. According to another possible scenario, the strip 5 can be heated in the homogenisation chamber 20 so as to have a (homogenised) outlet temperature greater than the inlet temperature. The method then comprises the implementation of the oxidation step c), i.e. the scrolling of the strip 5 in the oxidation chamber 30 comprising an oxygen volume concentration greater than 1% and preferably between 1.5% and 5%. During step c), an oxide layer is formed on the surface of the strip 5. The oxide formed is mainly iron oxide II, II-III, or III, generally. The method for thermally treating a steel strip 5 comprises, after step c), step d) during which, the steel strip 5 oxidised in step c), undergoes a thermal treatment at a strip temperature up to 800° C. and preferably up to 850° C. During this step d), the strip 5 is subjected to a reducing atmosphere preferably comprising a hydrogen volume concentration greater than 3%, and more preferably, between 3% and 5%. The remaining volume fraction being generally nitrogen. The temperature of the thermal treatment in the reduction zone during step d) can be modified, relatively easily, without steps a), b) and c) being greatly modified.

Figure 2:
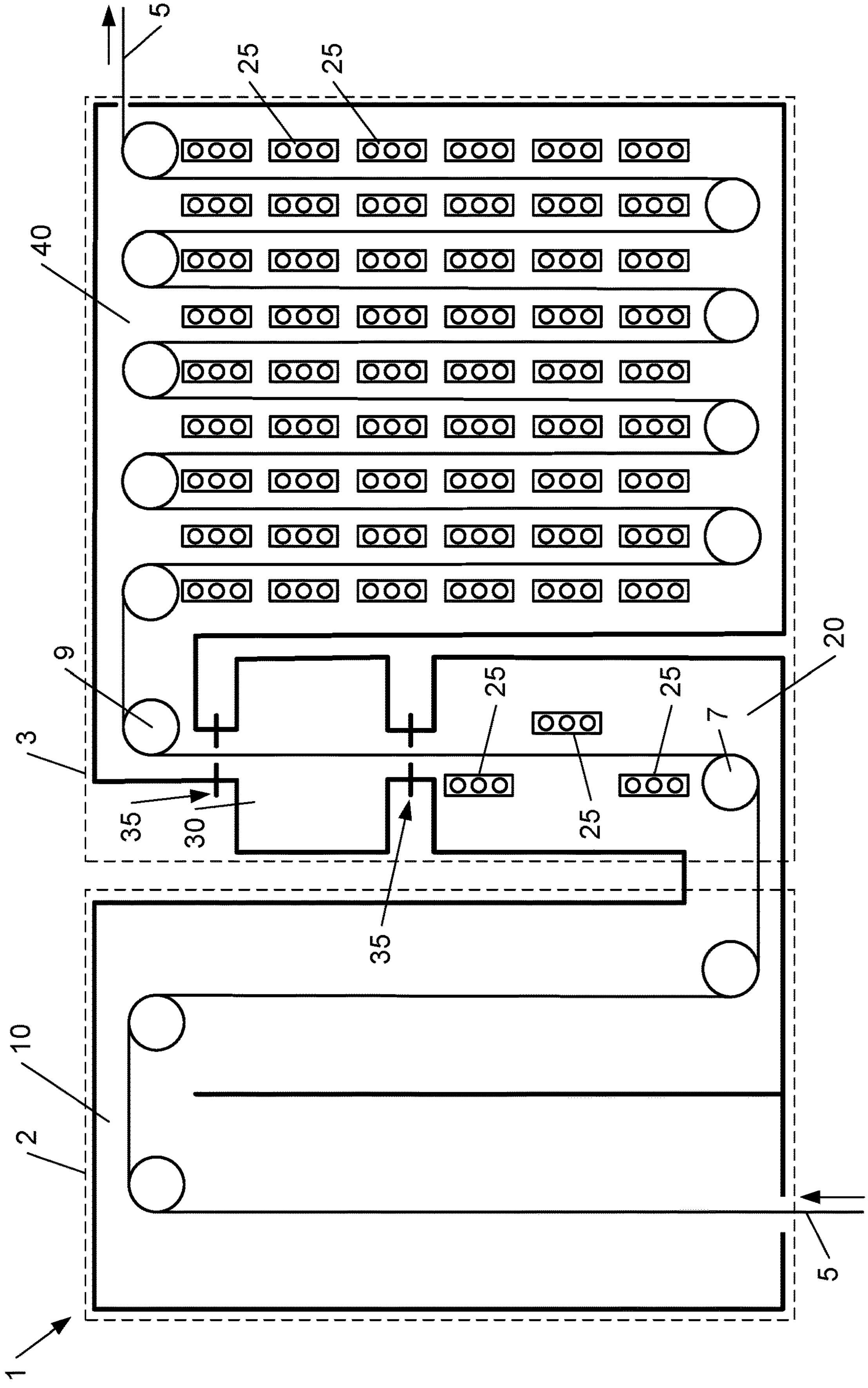
FIG. 2 shows an embodiment according to the invention.

FIG. 2 shows a view of the whole of a furnace 1 according to the second aspect of the invention, with a schematic representation of the progression of the strip 5 through the zone for heating with a direct flame 10, the homogenisation chamber 20, the oxidation chamber 30 and the reduction zone 40 comprised in the furnace 1. The strip 5 describes a succession of vertical passes during which it scrolls through the direct heating furnace section 2, then the radiant heating furnace section 3. After having scrolled through the zone for heating with a direct flame 10, the strip 5 enters into the radiant heating furnace section 3 through the homogenisation chamber 20. In the non-limiting example shown in FIG. 2, the zone for heating with a direct flame 10 comprises two pass lines. Then, the strip 5 is directed towards the temperature homogenisation chamber 20.

The pass line comprising the temperature homogenisation chamber 20 and the oxidation chamber 30 is situated in the RTF section (radiant heating furnace section) of the furnace 1. Thus, the oxidation chamber 30 is at a similar temperature of the RTF section which surrounds it while being preferably isolated at the level of the oxygen and hydrogen content.

After having left the oxidation chamber 30, the strip 5 enters into the reduction zone 40 for the thermal treatment thereof. The reduction zone 40 comprises a series of vertical passes surrounded by radiant heating tubes 25 making it possible for an adjustment of the temperature of the strip 5 in order to carry out a desired thermal treatment of the high-resistance steel strip 5.

Figure 3:
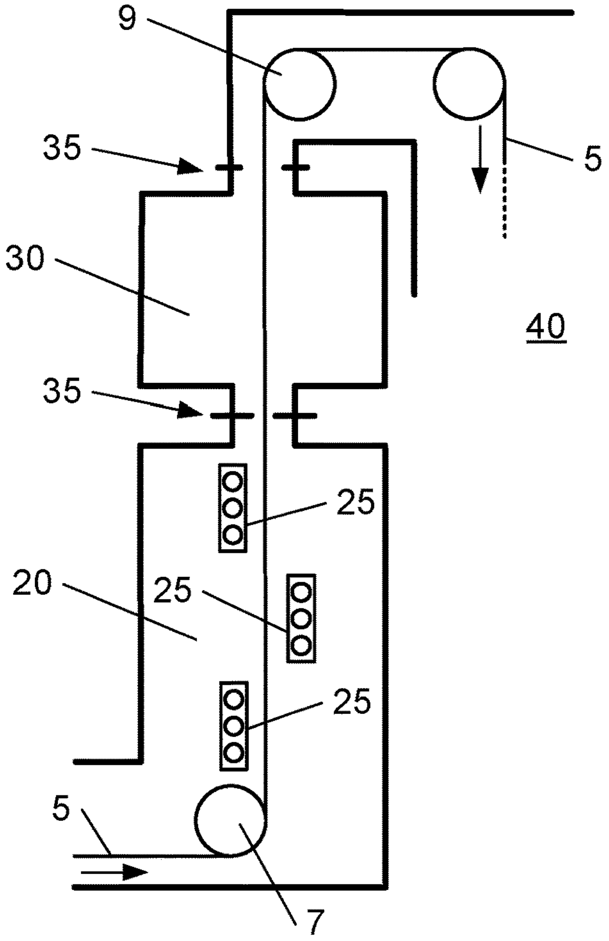
FIG. 3 shows a schematic view of the supply of a strip to a temperature homogenisation chamber, then to an oxidation chamber and the progression of the strip to a reduction zone.

FIG. 3 shows a schematic view of the supply of the strip 5 to the temperature homogenisation chamber 20, then to the oxidation chamber 30 and the progression of the strip 5 to the reduction zone 40. FIG. 3 shows a particular embodiment of the temperature homogenisation chamber 20 which illustrates, by way of example, three radiant heating tubes 25 arranged such that the strip 5 passes, in the proximity during the scrolling thereof, into the temperature homogenisation chamber 20. The temperature homogenisation chamber 20 illustrated makes it possible for good homogenisation of the temperature of the strip 5 at a target temperature, the target temperature being defined according to the composition of the steel. Thus, an oxide thickness specifically defined and homogenous over the whole of the surface of the strip 5 can be obtained.

For example, in operation, a steel strip 5 is supplied in a zone for heating with a direct flame 10 and is heated under reducing conditions, in the presence of carbon monoxide and hydrogen, preferably so as to reach a strip temperature of between 650° C. and 750° C. The steel strip is then brought towards the oxidation chamber 30 which is confined in the section of the radiant heating furnace (RTF), where the oxidation occurs with an oxygen content greater than 1%. This oxidation step makes it possible for the formation on the surface of an iron oxide layer, for example. Then, the oxide layer is removed during the step of thermally treating in a reducing atmosphere, in order to proceed with the galvanisation step according to a method well-known to a person skilled in the art.

The present invention has been described in relation to specific embodiment, which have a purely illustrative value and must not be considered as limiting. Generally, the present invention is not limited to the examples illustrated and/or described above. The use of the verbs "comprise", "include", "involve" or any other variant, as well as the conjugations thereof, cannot, in any manner, exclude the presence of elements other than those mentioned. The use of the indefinite article "one", "a" or "an", or the definite article "the", to introduce an element does not exclude the presence of a plurality of these elements. The reference numbers in the claims do not limit the scope thereof.

In summary, the invention can also be described as follows. Method for thermally treating a scrolling high-resistance steel strip 5 and comprising the following steps:

a) heating the strip 5 in a zone for heating with a direct flame 10;

b) temperature homogenisation of the strip 5 in a homogenisation chamber 20 comprising at least one radiant heating tube 25, so as to homogenise a temperature of the strip 5 after the passing thereof into the zone for heating with a direct flame 10;

c) oxidation of the strip 5 in an oxidation chamber 30 with an oxidising atmosphere having an oxygen volume concentration greater than 1%;

d) reduction of the strip 5 in a reduction zone 40 with a reducing atmosphere having a hydrogen volume concentration greater than 3%.

The embodiments of the invention in which an exclusive property or privilege is claimed are defined as follows:

1. A method for thermally treating a scrolling high-resistance steel strip, said method comprising the following steps:

a) heating the strip in a zone for heating with a direct flame, the heating step being carried out with an atmosphere having an oxygen volume concentration less than 0.01% by volume;

b) temperature homogenisation of the strip in a homogenisation chamber comprising at least one radiant heating tube, so as to homogenise the strip in temperature after the passing through the zone for heating with a direct flame, the temperature homogenisation step being carried out with an atmosphere having an oxygen volume concentration less than 0.01% by volume;

c) after the temperature homogenization of the strip, oxidation of the strip in an oxidation chamber with an oxidizing atmosphere to form an oxide layer on the strip, wherein the temperature homogenisation results in growth of a more homogenous oxide layer thickness over the surface of the strip as compared to a thickness of an oxide layer without the temperature homogenisation;

d) after the oxidation of the strip, a further thermal treatment step which increases a temperature of the strip and comprising reduction of the strip in a reduction zone to remove the oxide layer.

2. The method according to claim 1, wherein the reduction zone has a reducing atmosphere having a hydrogen volume concentration greater than 3%.

3. The method according to claim 1, wherein the oxidation step is carried out at a strip temperature of between 650° C. and 750° C.

4. The method according to claim 1, wherein said oxidizing atmosphere has an oxygen volume concentration between 1.5% and 5%.

5. The method according to claim 1, wherein the temperature homogenisation step is carried out at a strip temperature of between 650° C. and 750° C.

6. The method according to claim 1, wherein the heating step a) is carried out so as to obtain a strip temperature of between 650° C. and 750° C.

7. The method according to claim 1, wherein the temperature homogenisation step is carried out with an atmosphere without oxygen.

8. The method according to claim 1, wherein the heating step a) is carried out with an atmosphere without oxygen.

9. The method according to claim 1, wherein the temperature homogenisation step is carried out by the scrolling of the strip in the proximity of said at least one radiant heating tube.

10. The method according to claim 1, wherein said homogenisation section comprises two radiant heating tubes and in that the strip scrolls between said two radiant heating tubes.

11. The method according to claim 1, wherein said oxidizing atmosphere has an oxygen volume concentration between 2% and 5%.

* * * * *